United States Patent
Costanzo et al.

(10) Patent No.: US 7,506,750 B2
(45) Date of Patent: Mar. 24, 2009

(54) CONVEYOR HAVING A CONVEYOR BELT WITH FLIGHTS, INCLUDING SEGMENTED FLIGHTS FOR GAPLESS END TRANSFER

(75) Inventors: Mark Costanzo, River Ridge, LA (US); Eric M. Pressler, New Orleans, LA (US)

(73) Assignee: Laitram, L.L.C., Harahan, LA (US)

( * ) Notice: Subject to any disclaimer, the term of this patent is extended or adjusted under 35 U.S.C. 154(b) by 401 days.

(21) Appl. No.: 11/306,554

(22) Filed: Jan. 2, 2006

(65) Prior Publication Data

US 2006/0207862 A1    Sep. 21, 2006

Related U.S. Application Data

(60) Provisional application No. 60/593,279, filed on Jan. 3, 2005.

(51) Int. Cl.
*B65G 17/24* (2006.01)
*B65G 17/08* (2006.01)
*B65G 15/44* (2006.01)

(52) U.S. Cl. ............... 198/779; 198/698; 198/600

(58) Field of Classification Search .......... 198/779, 198/698, 697, 600
See application file for complete search history.

(56) References Cited

U.S. PATENT DOCUMENTS

| | | | |
|---|---|---|---|
| 3,550,756 | A | 12/1970 | Kornylak |
| 3,894,627 | A | 7/1975 | Jabbusch et al. |
| 4,003,466 | A | 1/1977 | Muth |

(Continued)

FOREIGN PATENT DOCUMENTS

DE    10209155 A1    10/2002

(Continued)

OTHER PUBLICATIONS

Intralox, L.L.C., "Intralox Conveyor Belting Engineering Manual 2004," published 2004, title page and pp. 52-63, Intralox, L.L.C., Harahan, LA 70123, U.S.A.

(Continued)

*Primary Examiner*—Mark A Deuble
(74) *Attorney, Agent, or Firm*—James T. Cronvich

(57) ABSTRACT

A conveyor having a flighted belt and providing a gapless end-off or end-on transfer of articles. The conveyor belt includes segmented flights at spaced intervals along its length. Each segmented flight includes slots dividing the flight into laterally spaced segments, or dogs. A transfer platform allows for a smooth transfer of articles onto or off the end of the belt. Fingers on the transfer platform separated by gaps extend to distal finger tips that are positioned close to the conveying surface of the belt at an end of the conveyor. The transfer platform is laterally aligned with the gaps positioned to coincide with the flight segments to permit them to pass cleanly through as the belt articulates about a sprocket set at the end of a carryway. The transfer platform may be tilted relative to vertical to gain an assist from gravity in transferring articles. Alternatively, a retractable rake mechanism including a tined rake belt positioned above the end of the conveyor belt is used to comb through the segmented flights to sweep articles off the end of the conveyor belt and across the transfer platform. Optional article-advancing rollers in the conveyor belt between consecutive flights propel articles forward along the belt to a forward flight.

30 Claims, 5 Drawing Sheets

U.S. PATENT DOCUMENTS

| | | | |
|---|---|---|---|
| 4,051,949 A | 10/1977 | Lapeyre | |
| 4,171,045 A | 10/1979 | Lapeyre | |
| 4,172,516 A * | 10/1979 | Curl et al. | 198/635 |
| 4,262,794 A | 4/1981 | Bourgeois | |
| 4,273,234 A * | 6/1981 | Bourgeois | 198/347.3 |
| 4,682,684 A | 7/1987 | Löthman | |
| 4,821,869 A | 4/1989 | Hodlewsky | |
| 4,832,183 A | 5/1989 | Lapeyre | |
| 5,038,921 A | 8/1991 | Hoppmann et al. | |
| 5,064,054 A * | 11/1991 | Hoppmann et al. | 198/779 |
| 5,165,514 A | 11/1992 | Faulkner | |
| 5,190,137 A | 3/1993 | Tas | |
| 5,215,182 A | 6/1993 | Garbagnati | |
| 5,322,158 A | 6/1994 | Boorsboom et al. | |
| 5,337,886 A | 8/1994 | Anderson et al. | |
| 5,490,591 A | 2/1996 | Faulkner | |
| 5,551,543 A | 9/1996 | Mattingly et al. | |
| 5,584,373 A | 12/1996 | Layne | |
| 6,164,435 A | 12/2000 | Coen et al. | |
| 6,296,110 B1 | 10/2001 | van Zijderveld et al. | |
| 6,318,544 B1 * | 11/2001 | O'Connor et al. | 198/853 |
| 6,332,531 B1 | 12/2001 | Damkjaer | |
| 6,467,610 B1 | 10/2002 | MacLachlan | |
| 6,494,312 B2 * | 12/2002 | Costanzo | 198/779 |
| 6,758,323 B2 * | 7/2004 | Costanzo | 198/457.02 |
| 6,997,309 B2 | 2/2006 | Stebnicki et al. | |
| 7,111,725 B2 * | 9/2006 | Marshall et al. | 198/850 |
| 2006/0118389 A1 | 6/2006 | Henley | |
| 2006/0151304 A1 | 7/2006 | Ozaki et al. | |
| 2007/0034481 A1 * | 2/2007 | Fourney | 198/779 |

FOREIGN PATENT DOCUMENTS

| | | |
|---|---|---|
| GB | 2278329 A | 11/1994 |
| JP | 8244938 A | 9/1996 |

OTHER PUBLICATIONS

European Patent Office, "Partial International Search Report of International Patent Application No. PCT/US2005/047444," Apr. 26, 2006, European Patent Office, Rijswijk, the Netherlands.

European Patent Office, "International Search Report of PCT/US2005/047444," Jun. 21, 2006, European patent Office, Rijswijk, the Netherlands.

* cited by examiner

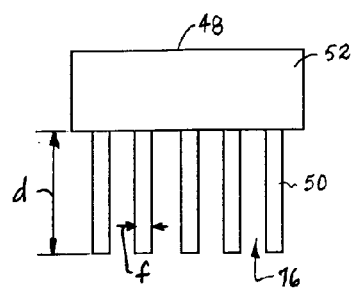 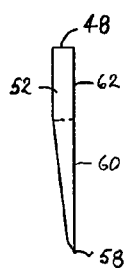
FIG. 3A    FIG. 3B
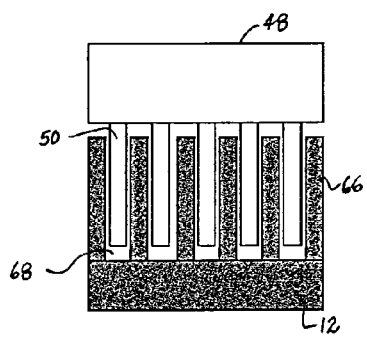
FIG. 4
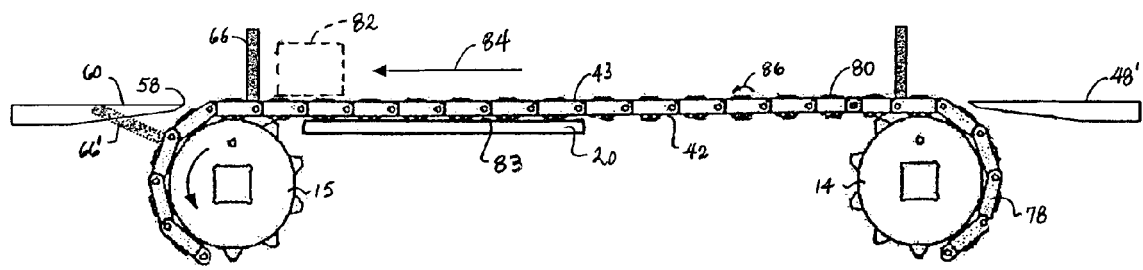
FIG. 5

CONVEYOR HAVING A CONVEYOR BELT WITH FLIGHTS, INCLUDING SEGMENTED FLIGHTS FOR GAPLESS END TRANSFER

BACKGROUND

The invention relates generally to power-driven conveyors and, more particularly, to a conveyor belt with flights and to transferring articles onto and off modular conveyor belts at the ends of a conveyor.

In many conveyor applications, it is necessary to separate conveyed articles into individual groups atop a conveyor belt. Flights extending upward from the belt's conveying surface and across its width at spaced intervals are used to divide a belt into bins. A conveyed article or a group of conveyed articles in one bin is separated from another article or group of articles in a neighboring bin by an interposed flight. In other applications, flights are used in transporting articles along inclined paths. The flights prevent gravity from causing articles to slide or roll all the way down the conveying surface of the belt. But there are problems associated with transferring articles onto and off the ends of flighted conveyors. Because flights are relatively tall and extend across the width of the belt, they prevent a transfer element from being positioned close to the belt's conveying surface in an end-off or end-on transfer. The transfer element must be spaced a sufficient distance from the conveying surface at the transfer end of the belt to avoid contact with the flights. Unless the conveyed articles have a footprint greater than the space between the belt and the transfer element or are transferred along the face of the flight as it passes the transfer element, they would fall into the space Thus, there is a need for a conveyor that includes the advantages of flights and for a conveyor with flights that is capable of end-on and end-off article transfers.

SUMMARY

These needs and others are satisfied in a conveyor embodying features of the invention. One version of the conveyor comprises a series of rows of belt modules that extend longitudinally in the direction of belt travel from a first end to a second end, laterally from a first side to a second side, and in thickness from a bottom to a top surface. Consecutive rows are connected together end to end at a hinge joint to form an endless belt loop. Upstanding from the top surface of separate rows of the belt are flights with top edges extending laterally at least partway across the rows. Consecutive flights divide the top surface of the belt into individual bins. Laterally spaced slots extending from the top edge toward the top surface of the modular belt rows divide each flight into laterally spaced flight segments. A conveyor frame supports the conveyor belt loop for travel along a carryway and an opposite returnway between opposite ends of the conveyor. A transfer platform is at an end of the conveyor. Conveyed articles transfer between the platform and the belt across the platform. The platform includes fingers extending from a plate to distal finger tips. The fingers are spaced laterally by gaps. The finger tips are positioned at the end of the conveyor close to the belt. The slots in the flights on the belt are spaced apart laterally to coincide with the fingers.

In another aspect of the conveyor, a similar belt has dogs with a longitudinal dimension and a lateral dimension. The lateral dimension of a dog is greater than its longitudinal dimension. A transfer platform has laterally spaced fingers that extend toward the top surface of the belt at the end of the conveyor. The dogs are spaced apart laterally to coincide with the gaps between the fingers.

In another aspect of the invention, a conveyor belt comprises an endless conveyor belt loop that extends longitudinally in the direction of belt travel, laterally from a first side to a second side, and in thickness from a bottom to a top surface. Fights upstanding from the top surface outward to a top edge extend laterally across the conveyor belt at longitudinally spaced intervals to form bins between consecutive flights. Rollers extend through the thickness of the conveyor belt past the top and bottom surfaces between consecutive flights.

In yet another aspect of the invention, a conveyor belt module comprises a module body extending longitudinally from a first end to a second end, laterally from a first side to a second side, and in thickness from a bottom to a top surface. Hinge members are spaced apart laterally along the first and second ends. Dogs, upstanding from the top surface, are spaced apart laterally across slots. Each dog has a lateral dimension greater than a longitudinal dimension.

In another aspect of the invention, a conveyor belt module comprises a module body extending longitudinally from a first end to a second end, laterally from a first side to a second side, and in thickness from a bottom to a top surface. Hinge members are spaced apart laterally along the first and second ends. Upstanding from the top surface is a flight that extends to a top edge at a height above the top surface. The flight extends laterally across the module body and forms flight segments laterally spaced by slots extending from the top edge of the flight toward the top surface of the module body. Each flight segment has a longitudinal length less than a lateral width.

BRIEF DESCRIPTION OF THE DRAWINGS

These and other features and aspects of the invention, as well as its advantages, are better understood by reference to the following description, appended claims, and accompanying drawings, in which:

FIGS. 3A and 3B are top plan and side elevation representations of a transfer platform for use in a conveyor as in FIG. 1;

FIG. 4 is a top plan representation of an article transfer point in a conveyor as in FIG. 1;

FIG. 5 is a side elevation view of a portion of a conveyor as in FIG. 1, but showing a roller belt for propelling conveyed articles off the exit end of the conveyor;

DETAILED DESCRIPTION

Figure 1:
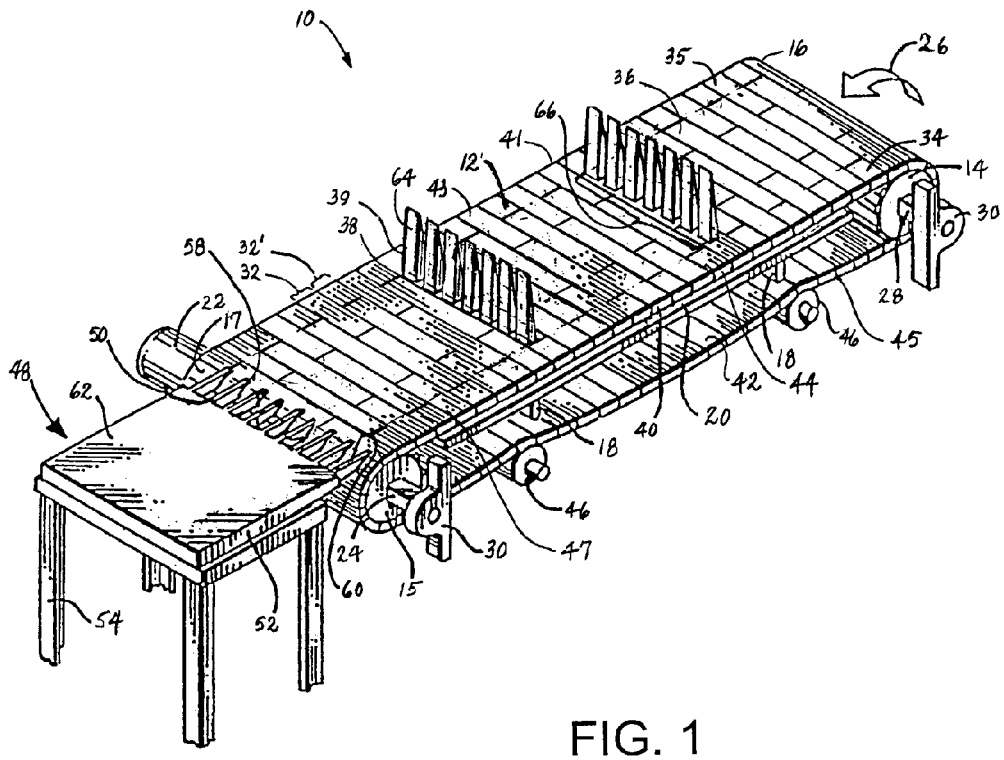
FIG. 1 is an isometric view of one version of a conveyor embodying features of the invention.

A conveyor embodying features of the invention is shown in FIG. 1. The conveyor 10 includes a conveyor belt 12 in the form of a belt loop wrapped around a pair of sprocket sets 14, 15, or drums, defining opposite ends 16, 17 of the conveyor. The conveyor belt is supported in a frame 18 (shown only partially to avoid clutter) atop a carryway pan 20, or wearstrips. A motor 22, coupled to a drive shaft 24 on which the drive sprocket set 15 is mounted, drives the belt in a direction of belt travel 26. (With a reversing motor or gearing, the belt may be driven bidirectionally.) A motorized pulley could be used instead of the motor drive shaft and drive sprockets in situations where saving space is important, for example. The other sprocket set 14 is mounted on an idler shaft 28. Both the idler shaft and the drive shaft are supported at opposite ends in bearing blocks 30 mounted on the conveyor frame.

The conveyor belt 12 is preferably a modular plastic conveyor belt, such as one of those manufactured and sold by Intralox, L.L.C., of Harahan, La., USA. The modular belt is constructed of a series of rows 32, 32' of one or more belt modules, such as short edge modules 34, long edge modules 35, and interior modules 36, arranged in a bricklay pattern. The modules are conventionally molded out of a thermoplastic polymer, such as polyethylene, polypropylene, acetal, or a composite polymeric material. Each row extends longitudinally from a first end 38 to a second end 39, laterally from a first side 40 to a second side 41, and in thickness from a bottom 42 to a top surface 43. Consecutive rows are connected together at hinge joints 47 that enable the belt to articulate about sprockets. The belt follows a conveying path including along a carryway 44 atop the carryway pan and along an opposite returnway 45 below the carryway. Rollers 46, drums, or shoes support the belt in the returnway and reduce sag. Along the carryway, the belt defines a generally planar carryway path for transporting articles from one end of the conveyor to the other. Positioned at the exit end 17 of the conveyor exemplified by FIG. 1 is a transfer device for offloading articles off the end of the conveyor. The device is a transfer platform 48 that includes fingers 50 extending outward from a plate 52 mounted on a frame 54 that may be part of the main conveyor frame. The fingers are separated laterally by gaps 56 and extend to finger tips 58 close to the top surface 43 of the belt. Top finger surfaces 60 are coplanar with a transfer plate surface 62 so that articles transferred between the belt and the conveyor may transfer smoothly.

Figure 2A:
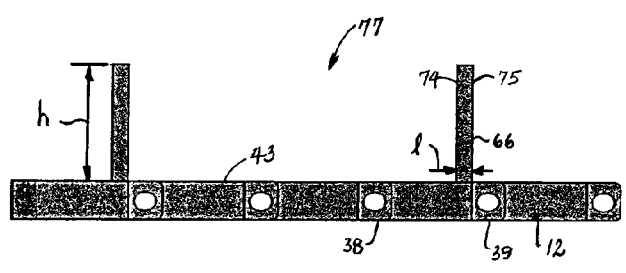
FIGS. 2A and 2B are side elevation and front elevation representations of a portion of a conveyor belt used in a conveyor as in FIG. 1.
Figure 2B:
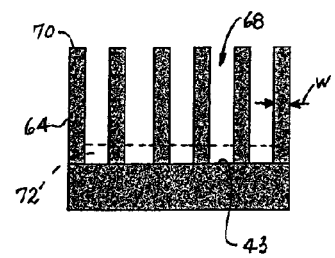

Periodically spaced along the length of the belt in selected belt rows are groups of laterally spaced dogs 64 forming segmented flights 66 across the width of the belt. The dogs are preferably unitarily molded with the modules from which they extend. As shown in FIGS. 2A and 2B, each dog 64, or flight segment, extends from the top surface 43 of the belt 12 to a height h above the top surface. In the examples shown, all the dogs are of the same height, but it would be possible for dogs to be of different heights, with the tallest one defining a maximum dog height. Although the dogs may have a variety of shapes, each has a general longitudinal dimension l, or length, in the direction of belt travel and a general lateral dimension w, or width. Preferably, the width is greater than the length, and the height is greater than the width, but these preferences are not essential. Slots 68 formed in the flight extend from a top edge 70 of the flight toward the top surface of the belt module to divide the flight into the laterally spaced flight segments. In this example, the top edge of the flight is parallel to the top surface, although it could be made higher at some points than at others. The slot may extend all the way to the top surface 43, or it may extend to a web 72 that may be formed between the segments above the top surface. Each dog has a first face 74 nearer the first end 38 of a belt row and an opposite second face 75 nearer the second end 39. The first faces of all the dogs in a row are preferably parallel to each other, and the second faces are all preferably parallel to each other. Consecutive flights bracket a moving bin 77, in which articles may be kept separate from articles in other bins.

The transfer platform 48 is shown in FIGS. 3A and 3B. The fingers 50 extend from the plate 52 to finger tips 58 at their distal ends. The top finger surface 60 is preferably coplanar, or at least continuous, with the plate surface 62. The gaps 76 extend between consecutive fingers to a depth d inward of the finger tips. Each finger has a width f measured laterally. Preferably, the width of a dog w is greater than the width of a finger f.

The purpose of the finger transfer platform is to allow the segmented flight to pass through the gaps between the fingers as the belt articulates about the sprocket set at the entrance or exit end of the conveyor in its transition between carryway and returnway. The slots in the flight allow the finger tips of the transfer platform to be positioned close to the top surface of the belt at the end of the conveyor. The close proximity of the finger tips to the belt allows the transfer platform to strip articles from or to transfer articles onto the top surface of the belt smoothly. The meshing of the fingers of the transfer platform with the flight segments allows the belt to be positioned more closely to an infeed or an outfeed conveyor on the other side of the transfer platform.

The placement of the transfer platform relative to the conveyor belt is shown in FIGS. 4 and 5. The finger tips 58 are close to the top surface 43 of the belt at the exit end of the conveyor. The finger top surfaces 60 at the tips are generally level with the level of the top surface of the belt for a smooth transfer or below the level of the top surface for a gravity-assisted transfer. As shown in FIG. 4, the transfer platform 48 is aligned laterally with the belt so that the fingers 50 coincide with the slots 68 in the flight 66 to allow the flight (as indicated by 66' in FIG. 5) to pass through cleanly. Because the fingers in this example do not extend onto the belt over the carryway, the depth of the gaps between fingers can be less than the maximum dog height. As further shown in FIG. 5, a second transfer platform 48' can be positioned at the infeed end of the conveyor belt to transfer articles onto the belt. The top surface of transfer platform feeding the belt is preferably placed at a level at or slightly above the level of the top surface of the belt on the carryway for a smooth transfer of articles onto the belt.

FIG. 5 also shows another type of belt that may be used in applications requiring conveyed articles to be offloaded at fixed intervals. In this version, a belt 78 has a plurality of rollers 80 with salient portions protruding beyond the bottom 42 and top surface 43 of each module. The rollers may be in modules in all belt rows or only in selected rows. Modules with flights may include rollers, too. Articles 82 are supported atop the rollers. The bottom salient portions of the rollers ride on an underlying bearing surface 83, which may be the top surface of a carryway pan 20 near the exit end of the conveyor. As the belt is driven to the left in FIG. 5 as indicated by arrow 84, the rollers rotate on the bearing surface in the direction indicated by arrow 86. The rotation of the rollers on their axes propels the conveyed article across the top surface 43 of the belt at a speed higher than the forward speed of the belt itself. In this way, this belt can propel conveyed articles onto and across the transfer platform to another conveyor.

Figure 6:
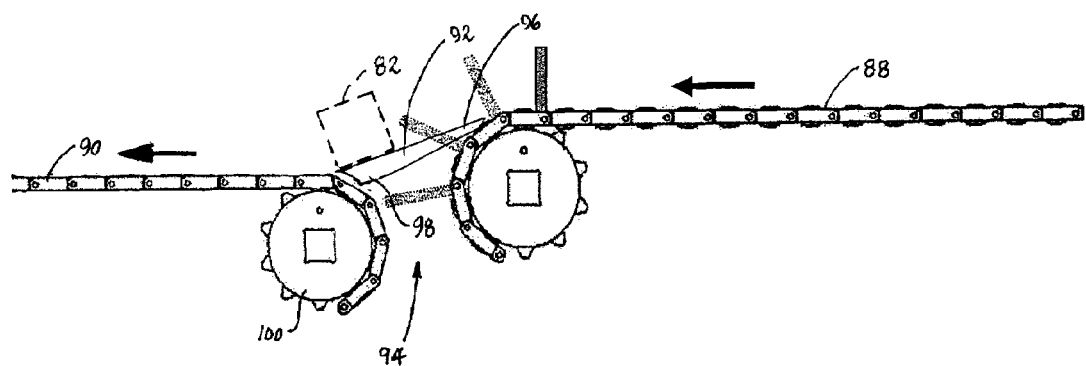
FIG. 6 is a side elevation view of a portion of a conveyor as in FIG. 5, instead showing a tilted transfer platform using gravity assist to transfer articles to a takeaway conveyor belt.
Figure 7:
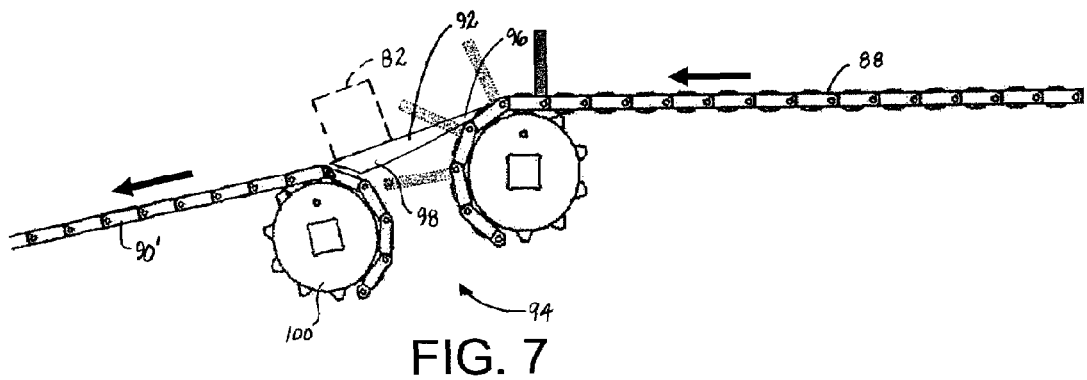
FIG. 7 is a side elevation view of a portion of a conveyor as in FIG. 6, but with a takeaway conveyor belt running on a decline.

Other versions of a conveyor are shown in FIGS. 6 and 7. In these versions, a flighted belt 88, which may include rollers as shown or may have a generally flat top surface, feeds articles 82 to a takeaway conveyor belt 90 positioned at a different vertical level. A finger transfer platform 92 bridges a space 94 between the two belts. The fingers 96 of the transfer platform extend to the flighted belt to strip articles from its top conveying surface. The plate end 98 of the transfer platform is beveled or scalloped on its bottom to avoid contact with the takeaway belt as it articulates about its sprockets 100. The transfer platform is tilted off horizontal to get an assist from gravity in transferring articles across itself. The takeaway belt 90', shown in FIG. 7, runs on a decline.

Figure 8:
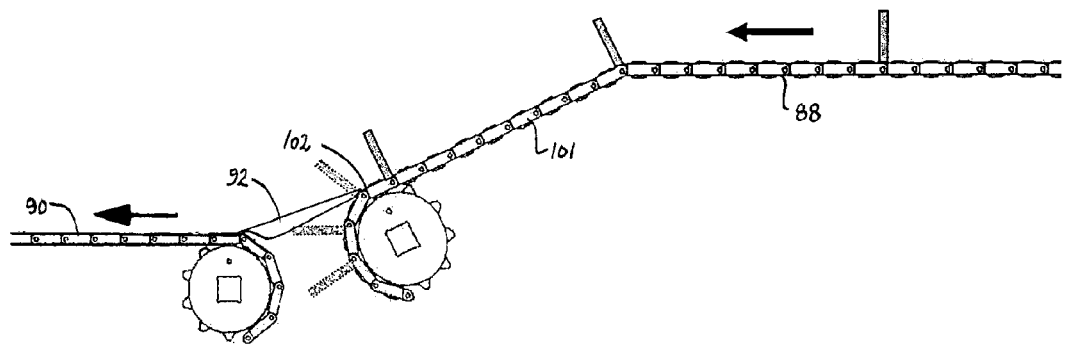
FIG. 8 is a side elevation view of a portion of a conveyor as in FIG. 6, but with the exit end of the main conveyor belt tilted off horizontal.

Gravity assistance in transferring products is alternatively achieved by tilting an end portion 101 of the conveyor belt 88 at the exit end 102 of the conveyor off horizontal, as shown in FIG. 8. The transfer platform 92 is arranged generally in line with the belt at the exit. Articles are then transferred to the takeaway belt 90, which may be horizontal, inclined, or declined.

Figure 10:
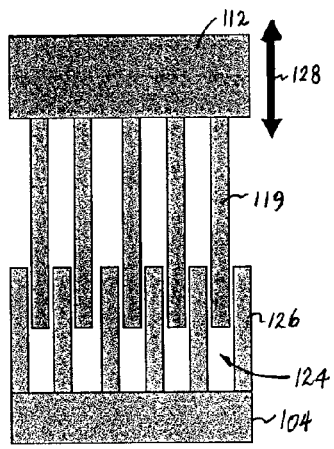
FIG. 10 is a front elevation view of the rake meshing with the segmented flight of the main conveyor belt of FIGS. 9A and 9B.
Figure 11:
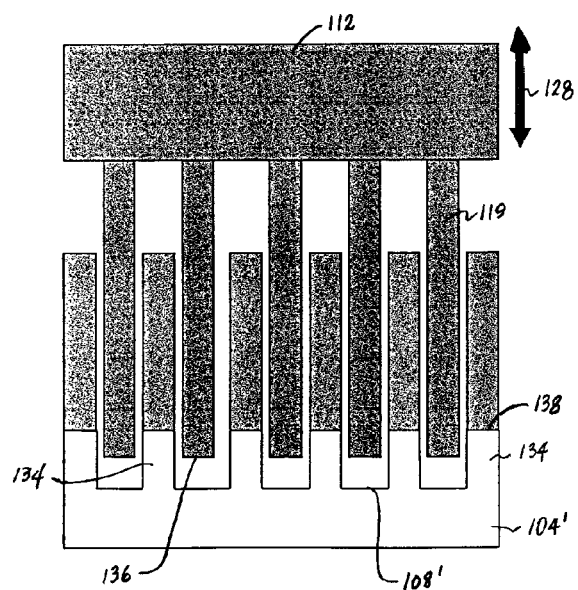
FIG. 11 is a front elevation view as in FIG. 10, depicting a main conveyor belt having raised longitudinal ribs extending above its top surface.
Figure 9A:
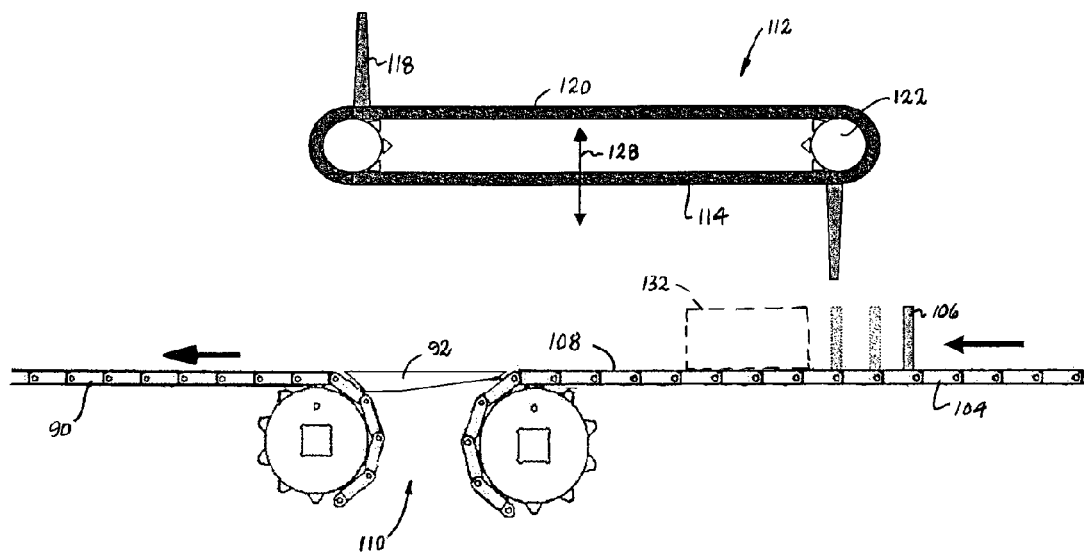
FIG. 9A is a side elevation view of a portion of a conveyor as in FIG. 1 having an overhead rake belt shown in a retracted position.
Figure 9B:
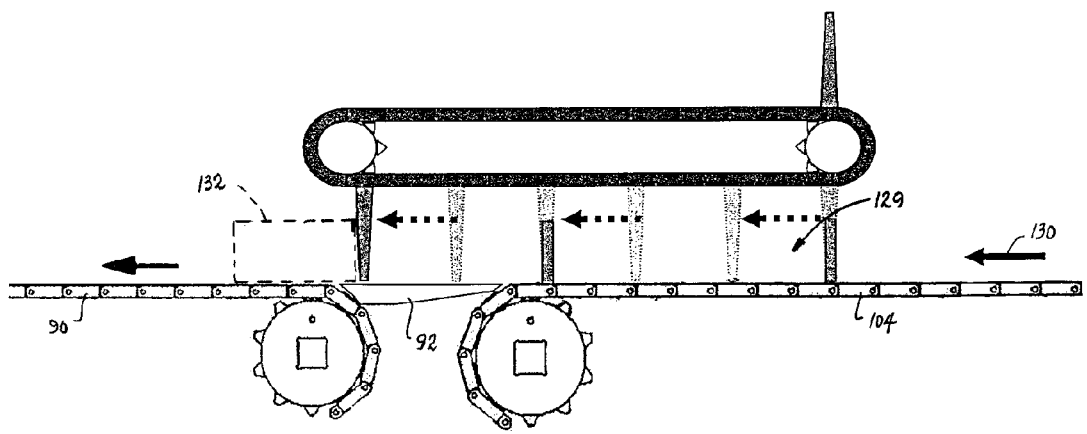
FIG. 9B is a side elevation view of the conveyor in FIG. 9A with the rake belt in a raking position to sweep articles off the end of the main conveyor, across a transfer platform, and onto a takeaway conveyor.

Articles may also be swept from a flighted belt by a rake belt as shown in FIGS. 9A, 9B, and 10. A main conveyor belt 104 has segmented flights 106 periodically spaced along its top conveying surface 108. The main conveyor belt may or may not include rollers as in the belts in FIGS. 5-8. A takeaway conveyor belt 90 is positioned at the same vertical level as the main conveyor belt. The two belts are separated by a space 110. A finger transfer platform 92 bridges the space between the two conveyors. Because the transfer platform is generally horizontal, a rake mechanism 112 is used to sweep conveyed articles across the transfer platform. The rake mechanism includes an overhead belt 114 situated above the exit end 116 of the main conveyor, generally parallel to the main conveyor belt and spanning the space. One or more rakes 118, similar to the segmented flights, each have a set of tines 119 extending outward of an outer surface 120 of the overhead belt. The belt, which may be a flat belt or a modular plastic belt, is motor-driven by any conventional means, such as pulleys, drums, or sprockets 122. As shown in FIG. 10, the tines of the rake are positioned laterally to align with gaps 124 between consecutive flight segments 126. The rake mechanism is optionally retractable, indicated as vertically retractable by arrows 128 by any means for lifting and lowering the mechanism between a retracted position (FIG. 9A) and a sweeping position (FIG. 9B). Shown in the sweeping position in FIG. 9B, the rake belt, which, while sweeping, is preferably driven at a speed at least as great as the speed of the main conveyor belt, is lowered into the sweeping position in synchronism with the main conveyor belt to confine the sweep of each rake to a single bin 129 between consecutive flights. The rake belt can be driven at a constant speed or by a variable-speed drive to coordinate, in conjunction with position sensors on the main conveyor, the speed of the rake belt to the advance of the main conveyor belt. The lowering of the rake mechanism and the speed of the rake belt are coordinated with the speed of the main conveyor belt so that each rake preferably meets a flight as the tines reach the top edge of the flight. Because the rake is advancing at a speed in the direction of belt travel 130 at least as great as the speed of the main belt, the rake combs through the flight and sweeps conveyed articles 132 across the transfer platform onto the takeaway belt. As shown in FIG. 11, the main conveyor belt 104' alternatively has laterally spaced longitudinal raised ribs 134 above a top surface 108' of the belt. Each rib extends longitudinally the majority of the length of each belt row from end to end. Because articles are conveyed atop the raised ribs, distal ends 136 of the rake's tines 119 can be lowered to a position below the top 138 of the ribs for effectively sweeping flat articles having low vertical profiles.

Thus the invention has been described with reference to a few versions. But other versions are possible. For example, the flights do not have to extend perpendicularly upward from the top surface of the belt; they could extend at an oblique angle. Furthermore, the flights could have curved faces, rather than the flat faces shown, forming flight segments that could be circular in cross section, for instance. As another example, the flights need not be integrally molded with the belt modules; they could be attached to the belt by any of the various means used to attach accessories to modular belts. Or, as another example, the flights could be made of a different material from the belt modules, such as a flexible elastomeric material co-molded with or otherwise attached to the belt modules. So, as these few examples suggest, the scope of the claims is not meant to be limited to the versions described in detail or to the preferred features discussed.

What is claimed is:

1. A conveyor belt comprising:
   an endless conveyor belt loop extending longitudinally in a direction of belt travel, laterally from a first side to a second side, and in thickness from a bottom to a top surface;
   a plurality of flights upstanding from the top surface outward to a top edge and extending laterally across the conveyor belt at longitudinally spaced intervals to form bins between consecutive flights;
   a plurality of rollers arranged in longitudinally spaced lateral rows of rollers extending through the thickness of the conveyor belt past the top and bottom surfaces between consecutive flights to support articles conveyed along the top surface.

2. A conveyor belt as in claim 1 wherein each flight forms a plurality of flight segments laterally spaced by slots extending from the top edge of the flight toward the top surface of the conveyor belt, wherein each flight segment has a lateral width and a longitudinal length less than the lateral width.

3. A conveyor belt as in claim 1 wherein the rollers are arranged to rotate on lateral axes to propel conveyed articles in the direction of belt travel.

4. A conveyor comprising:
   a modular conveyor belt comprising:
      a series of rows of one or more belt modules, each row extending longitudinally in the direction of belt travel from a first end to a second end, laterally from a first side to a second side, and in thickness from a bottom to a top surface, with consecutive rows connected together end to end at a hinge joint to form an endless conveyor belt loop,
      a plurality of flights upstanding from the top surface of separate rows to a top edge and extending laterally at least partway across the rows to divide the modular conveyor belt into individual bins between consecutive flights, wherein the flights form laterally spaced slots extending from the top edge toward the top surface of the row to divide the flight into flight segments;
   a conveyor frame supporting the conveyor belt loop for travel along a carryway and an opposite returnway between opposite ends of the conveyor;

a transfer platform disposed at an end of the conveyor across which conveyed articles transfer between the modular conveyor belt and the transfer platform comprising:
a plate,
a plurality of laterally spaced fingers separated by gaps and extending from the plate to distal finger tips,
wherein the finger tips are disposed proximate the modular conveyor belt at the end of the conveyor with the slots in the flights spaced apart laterally to coincide with the fingers; and
a rake mechanism including:
a rake belt positioned to advance in the direction of belt travel outward of the top surface of the modular conveyor belt along the carryway, the rake belt including;
one or more rakes extending outward of an outer surface of the rake belt;
wherein each rake has a plurality of laterally spaced tines;
wherein the rake belt is aligned laterally relative to the modular conveyor belt with the tines of the rake laterally aligned with the slots in the flights.

5. A conveyor as in claim 4 wherein the fingers have top finger surfaces generally defining a plane at or slightly below the level of the top surface of the modular conveyor belt on the carryway.

6. A conveyor as in claim 4 comprising a second transfer platform at the other end of the conveyor.

7. A conveyor as in claim 4 wherein the modular conveyor belt further comprises a plurality of rollers in at least some of the rows, the rollers protruding outward of the bottom and top surface of the belt, and wherein the conveyor comprises a bearing surface underlying the rollers proximate the bottom of the belt along the carryway at the end of the conveyor proximate the transfer platform to provide a surface along which the rollers rotate to propel conveyed articles along the top surface of the belt in the direction of belt travel and onto the transfer platform.

8. A conveyor as in claim 4 wherein the transfer platform is tilted relative to horizontal.

9. A conveyor as in claim 4 wherein the modular conveyor belt at the end of the conveyor proximate the transfer platform is tilted relative to horizontal.

10. A conveyor as in claim 4 wherein the rake belt advances in the direction of belt travel at least as fast as the modular conveyor belt.

11. A conveyor as in claim 4 wherein the rake mechanism is movable between a first retracted position away from the modular conveyor belt and a second position closer to the top surface of the modular conveyor belt along the carryway to enable the rake belt to sweep conveyed articles from the modular conveyor belt.

12. A modular conveyor belt comprising:
a series of rows of one or more belt modules, each row extending longitudinally in the direction of belt travel from a first end to a second end, laterally from a first side to a second side, and in thickness from a bottom to a top surface, with consecutive rows connected together end to end at a hinge joint to form an endless conveyor belt loop;
a plurality of flights upstanding from the top surface of separate rows to a top edge and extending laterally at least partway across the rows to divide the modular conveyor belt into individual bins between consecutive flights, wherein the flights form laterally spaced slots extending from the top edge toward the top surface of the row to divide the flight into laterally spaced flight segments; and
a plurality of rollers in at least some of the rows, the rollers protruding outward of the bottom and top surface of the belt.

13. A modular conveyor belt as in claim 12 wherein the modular conveyor belt further includes laterally spaced longitudinal raised ribs upstanding from the top surface.

14. A conveyor belt module comprising:
a module body extending longitudinally from a first end to a second end, laterally from a first side to a second side, and in thickness from a bottom to a top surface;
hinge members spaced apart laterally along the first and second ends;
a flight upstanding from the top surface of the module body to a top edge extending laterally across the module body, wherein the flights form laterally spaced slots extending from the top edge toward the top surface of the row to divide the flight into laterally spaced flight segments; and
a plurality of rollers laterally spaced apart across the module body, the rollers protruding outward of the bottom and the top surface.

15. A conveyor comprising:
a modular conveyor belt comprising:
a series of rows of one or more belt modules, each row extending longitudinally in the direction of belt travel from a first end to a second end, laterally from a first side to a second side, and in thickness from a bottom to a top surface, with consecutive rows connected together end to end at a hinge joint to form an endless conveyor belt loop,
a plurality of dogs upstanding from the top surface of at least one of the rows and spaced apart laterally across slots, each dog having a longitudinal dimension and a lateral dimension greater than the longitudinal dimension;
a conveyor frame supporting the conveyor belt loop for travel along a carryway and an opposite returnway between opposite ends of the conveyor;
a transfer platform disposed at an end of the conveyor across which conveyed articles transfer between the modular conveyor belt and the transfer platform comprising:
a plurality of laterally spaced fingers separated by gaps, wherein the fingers extend toward the top surface of the belt at the end of the conveyor with the dogs spaced apart laterally to coincide with the gaps; and
a plurality of rollers in at least some of the rows, the rollers protruding outward of the bottom and top surface of the belt, and wherein the conveyor comprises a bearing surface underlying the rollers proximate the bottom of the belt along the carryway at the end of the conveyor proximate the transfer platform to provide a surface along which the rollers rotate to propel conveyed articles along the top surface of the belt in the direction of belt travel and onto the transfer platform.

16. A conveyor as in claim 15 wherein the dogs are laterally wider than the fingers.

17. A conveyor as in claim 15 wherein the fingers have top finger surfaces generally defining a plane at or slightly below the level of the top surface of the modular conveyor belt on the carryway.

18. A conveyor as in claim 15 wherein the modular conveyor belt further includes laterally spaced longitudinal raised ribs upstanding from the top surface.

19. A modular conveyor belt comprising:
- a series of rows of one or more belt modules, each row extending longitudinally in the direction of belt travel from a first end to a second end, laterally from a first side to a second side, and in thickness from a bottom to a top surface, with consecutive rows connected together end to end at a hinge joint to form an endless conveyor belt loop;
- a plurality of dogs upstanding from the top surface of at least one of the rows and spaced apart laterally across slots, each dog having a longitudinal dimension and a lateral dimension greater than the longitudinal dimension; and
- a plurality of rollers in at least some of the rows arranged to rotate about lateral axes and having salient portions protruding outward of the bottom and top surface.

20. A modular conveyor belt as in claim 19 wherein all the dogs extend from the top surface to the same height.

21. A modular conveyor belt as in claim 20 wherein the height of the dogs is greater than the lateral dimension of the dogs.

22. A modular conveyor belt as in claim 19 wherein each dog has a first face nearer the first end of the row and an opposite second face nearer the second end and wherein the first faces of all the dogs in a row are coplanar and the second faces of all the dogs in a row are coplanar.

23. A conveyor belt module comprising:
- a module body extending longitudinally from a first end to a second end, laterally from a first side to a second side, and in thickness from a bottom to a top surface;
- hinge members spaced apart laterally along the first and second ends;
- a plurality of dogs upstanding from the top surface and spaced apart laterally across slots, each dog having a longitudinal dimension and a lateral dimension greater than the longitudinal dimension; and
- a plurality of rollers arranged to rotate about lateral axes and having salient portions extending outward of the bottom and top surface.

24. A conveyor belt module as in claim 23 wherein all the dogs extend from the top surface to the same height.

25. A conveyor belt module as in claim 24 wherein the height of the dogs is greater than the lateral dimension of the dogs.

26. A conveyor belt module as in claim 23 wherein each dog has a first face nearer the first end of the module body and an opposite second face nearer the second end and wherein the first faces of all the dogs in a row are coplanar and the second faces of all the dogs in a row are coplanar.

27. A modular conveyor belt comprising:
- a series of rows of one or more belt modules, each row extending longitudinally in the direction of belt travel from a first end to a second end, laterally from a first side to a second side, and in thickness from a bottom to a top surface, with consecutive rows connected together end to end at a hinge joint to form an endless conveyor belt loop;
- a flight upstanding from the top surface of at least one of the rows to a top edge at a height above the top surface and extending laterally across the row and forming a plurality of lateral flight segments laterally spaced by slots extending from the top edge of the flight toward the top surface of the row;
- wherein each flight segment has a lateral width and a longitudinal length less than the lateral width; and
- a plurality of rollers in at least some of the rows arranged to rotate about lateral axes and having salient portions protruding outward of the bottom and top surface.

28. A modular conveyor belt as in claim 27 wherein the top edge of the flight is parallel to the top surface.

29. A conveyor belt module comprising:
- a module body extending longitudinally from a first end to a second end, laterally from a first side to a second side, and in thickness from a bottom to a top surface;
- hinge members spaced apart laterally along the first and second ends;
- a flight upstanding from the top surface to a top edge at a height above the top surface and extending laterally across the module body and forming a plurality of flight segments laterally spaced by slots extending from the top edge of the flight toward the top surface;
- wherein each flight segment has a lateral width and a longitudinal length less than the lateral width; and
- a plurality of rollers arranged to rotate about lateral axes and having salient portions extending outward of the bottom and top surface.

30. A conveyor belt module as in claim 29 wherein the top edge of the flight is parallel to the top surface.

* * * * *